Aug. 11, 1959  C. L. MICKELSON  2,898,779

DIFFERENTIAL FOR MOTOR VEHICLES

Filed May 8, 1958

INVENTOR
CHESTER L. MICKELSON

BY

ATTORNEYS

United States Patent Office 2,898,779
Patented Aug. 11, 1959

2,898,779

DIFFERENTIAL FOR MOTOR VEHICLES

Chester L. Mickelson, Milwaukee, Wis.

Application May 8, 1958, Serial No. 733,939

1 Claim. (Cl. 74—711)

This invention appertains to mechanisms for the transmission of power and more particularly to a novel differential for motor vehicles for driving the wheel axles thereof from a common propeller or drive shaft.

It is one of the primary objects of my invention to provide a differential which will bring about a positive drive to the wheel axles of a vehicle irrespective of whether or not one wheel on an axle tends to spin on a slippery surface, so that traction will be maintained at least on the wheel carried by the other axle, the construction being such as to still permit the faster rotation of one wheel than the other in rounding curves, etc.

A further important object of my invention is to provide a worm and worm wheel connection between the propeller shaft driven main gear and the stub axles for the ground wheels to bring about the synchronous positive drive of the stub axles with a pinion connection between the worm wheels for permitting a desired differential movement of the stub axles during the faster rotation of one wheel around a corner than the other.

A further salient object of the invention is to provide a differential for motor vehicles which will be of a durable and compact order, one that will be simple and easy to manufacture and one which can be readily assembled or taken apart for repairs.

Figure 1:
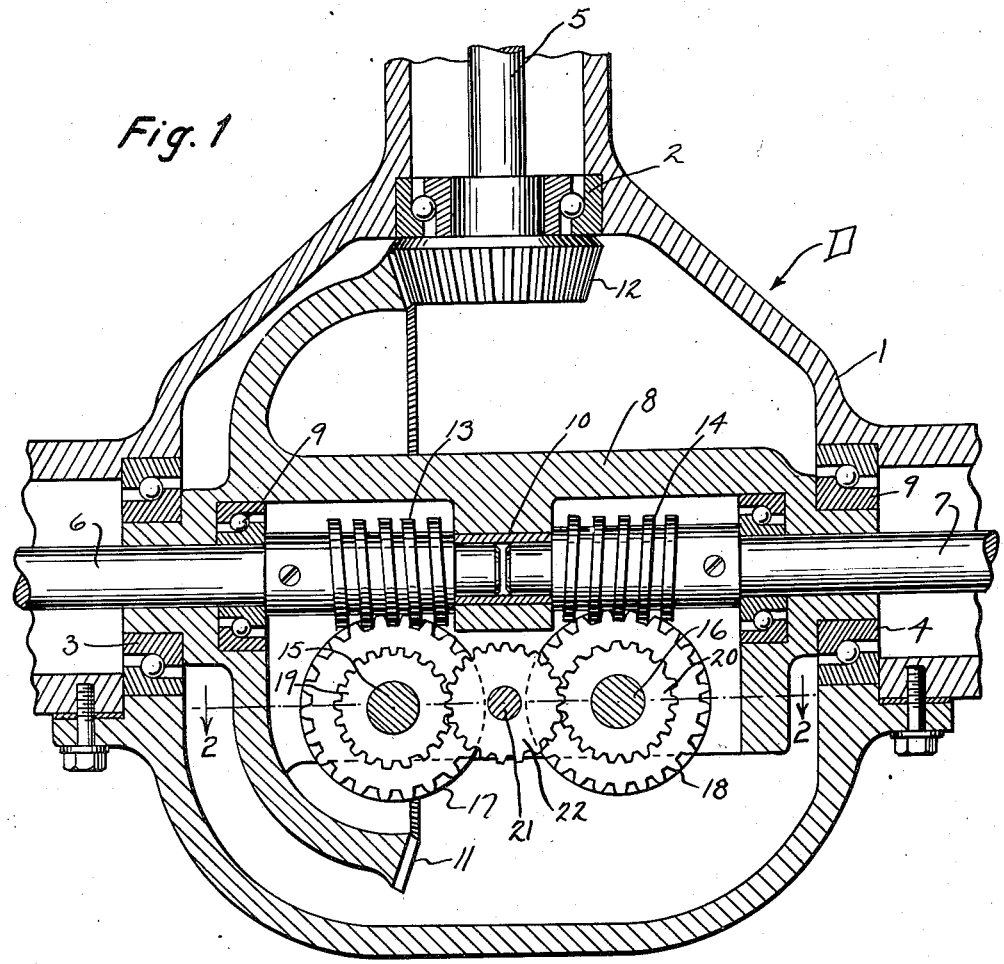

With these and other objects in view, the invention consists in the novel construction, arrangement and formation of parts, as will be hereinafter more specifically described and claimed, and illustrated in the accompanying drawing, in which drawing, Figure 1 is a horizontal, longitudinal sectional view through my improved differential.

Figure 2:
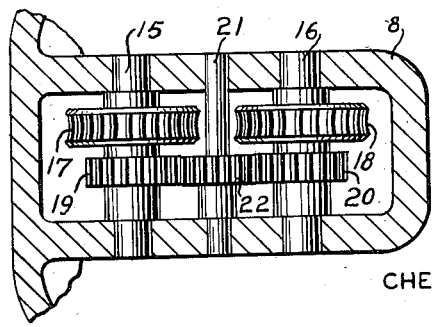

Figure 2 is a fragmentary sectional view through the differential taken on the line 2—2 of Figure 1 looking in the direction of the arrows.

Referring to the drawing in detail, the letter D generally indicates the differential and the same includes a housing 1 carrying anti-friction bearings 2, 3 and 4 for the propeller or drive shaft 5 and the stub axles 6 and 7. The stub axles extend into the housing 1 and terminate at the central portion thereof. Rotatably mounted within the housing, is a cage or spider 8. This cage or spider 8 is rotatably mounted on anti-friction bearings 9 carried by the inner ends of the stub axles 6 and 7. The central portion of the cage or spider 8 carries a bearing 10 into which is piloted the inner ends of the stub axles. Formed on or secured to the cage or spider 8 is a bevel gear 11, which constantly meshes with a drive bevel pinion 12, keyed or otherwise secured to the propeller or drive shaft 5.

Keyed or otherwise secured to the inner ends of the stub axles 6 and 7 are worms 13 and 14. Rotatably mounted in the cage or spider 8 are a pair of spaced driven shafts 15 and 16, and these shafts have keyed or otherwise secured thereto worm wheels 17 and 18 which are in constant mesh with the worms 13 and 14. The shafts 15 and 16 also have keyed thereto spur gears 19 and 20. Rotatably mounted on the cage or spider 8 between the shafts 15 and 16 is an idle shaft 21 carrying an idle pinion 22 which meshes with the spur gears 19 and 20.

In operation of the differential, the cage or spider 8 is rotated within the housing, through the medium of the drive shaft 5, bevel pinion 12 and bevel gear 11. The worm wheels 17 and 18 are carried with the cage and the worm wheels lock on the worms 13 and 14, and this brings about the positive drive of the axles 6 and 7 and consequently, synchronous operation of the axles 6 and 7 will be had irrespective of whether or not a wheel carried by a stub axle tends to spin on a slippery surface.

In rounding a curve, one stub axle is permitted to rotate faster than the other. For instance, if the axle 6 is rotating faster than the axle 7, then worm 13 will drive its worm wheel 17 and this rotation will be transmitted to the axle 7, but at a slower rate of speed.

Changes in details may be made without departing from the spirit or the scope of this invention, but what I claim as new is:

A differential for automobiles comprising a housing, a drive shaft extending into said housing and rotatably supported thereby, stub wheel axles extending into the housing and rotatably supported thereby, a cage rotatably mounted on the stub axles in said housing, a bevel gear rigidly connected with said cage, a bevel pinion secured to the drive shaft meshing with the bevel gear for rotating said cage in the housing, worms having oppositely directed threads secured to the inner ends of said stub axles, worm wheels rotatably mounted on the cage and movable with the cage in constant mesh with said worms for driving said stub axles during rotation of the cage, rotatable shafts carried by said cage supporting and carrying said worm wheels, an idle shaft carried by said cage, spur gears on the shafts for the worm wheels, and an idle pinion on the idle shaft meshing with the spur gears for transmitting movement from one worm wheel to the other.

References Cited in the file of this patent

UNITED STATES PATENTS

| | | |
|---|---|---|
| 1,164,770 | Walter | Dec. 21, 1915 |
| 1,294,040 | Brown | Feb. 11, 1919 |
| 1,407,703 | Moir | Feb. 28, 1922 |